May 28, 1968  P. G. BORDNER  3,385,001
COMBINATION WEATHER SEAL AND RUB STRIP
Filed April 28, 1967
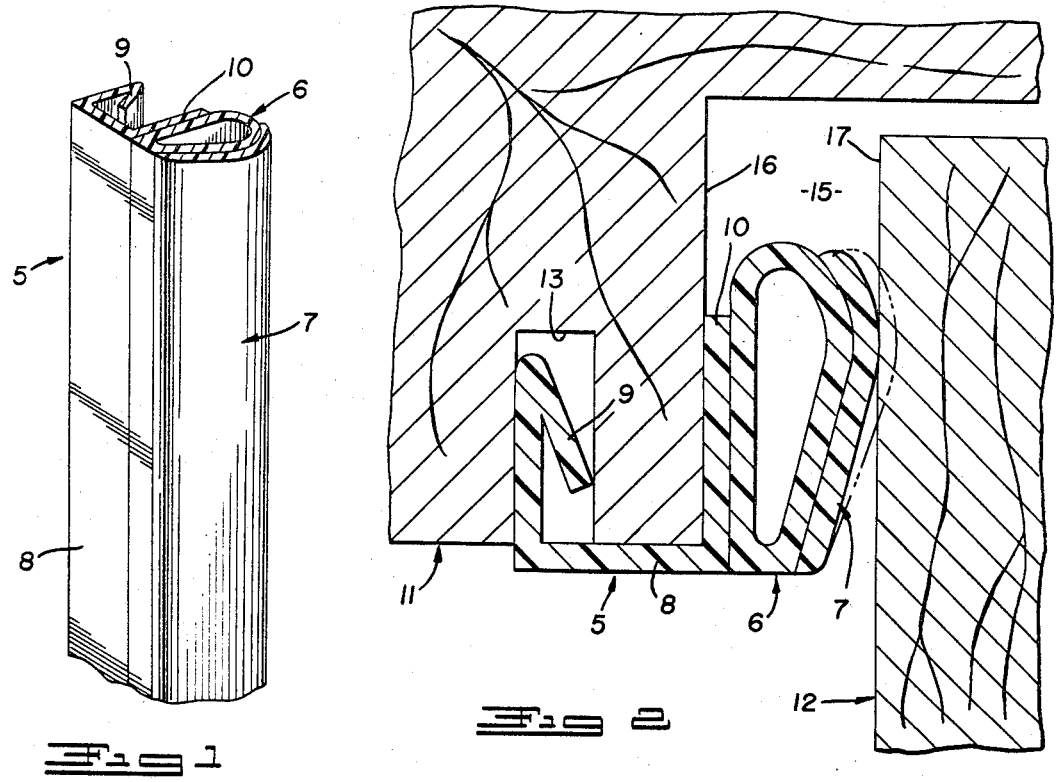
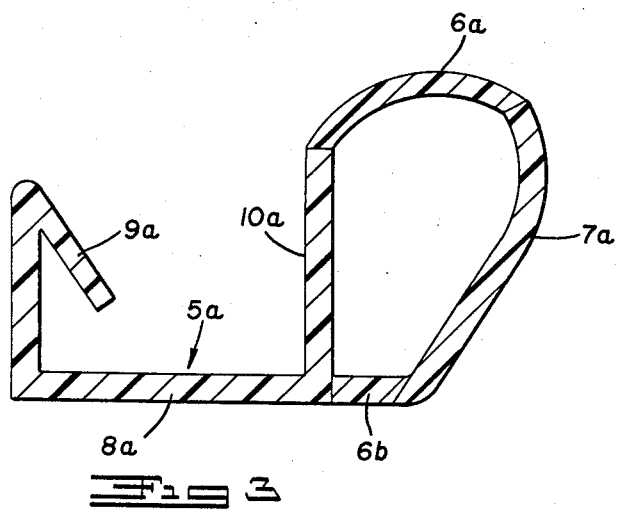
INVENTOR.
PAUL G. BORDNER
BY
MAHONEY, MILLER & RAMBO
BY *W. S. Rambo*
ATTORNEYS

United States Patent Office 3,385,001
Patented May 28, 1968

3,385,001
COMBINATION WEATHER SEAL AND RUB STRIP
Paul G. Bordner, Columbus, Ohio, assignor to Crane Plastics, Inc., Columbus, Ohio, a corporation of Ohio
Filed Apr. 28, 1967, Ser. No. 634,510
6 Claims. (Cl. 49—489)

ABSTRACT OF THE DISCLOSURE

A combination weather seal and rub strip for windows and doors which consists of an integral, plastic extrusion including a substantially rigid mounting web for attachment to a relatively stationary frame component of the window or door, an intermediate, resiliently compressible diaphragm section secured to the mounting web, and an outer, substantially rigid rub strip section secured to the diaphragm section and arranged for abutting frictional engagement with a movable window or door.

Objects of invention

The primary object of the present invention is to provide a combined weather seal and rub strip which may be easily and economically installed on a stationary frame component of a slidable or pivotal window or door and which is operable to effectively seal the window or door when the latter occupies its closed position, while at the same time providing a low coefficient of friction during movement of the window or door between closed and open positions and vice versa.

It is another object of this invention to provide a combination weather seal and rub strip of integral, one-piece, extruded plastic composition, and which embodies a relatively rigid mounting section adapted for attachment to a stationary frame component of a window or door, an intermediate, resiliently compressible diaphragm section extending outwardly from the mounting section, and a substantially rigid rub strip section extending outwardly from the intermediate section for frictional, abutting engagement with the relatively movable window or door member.

General description of drawing

The invention is illustrated in its preferred form in the accompanying drawing wherein:

FIGURE 1 is a perspective view of the strip.

FIGURE 2 is a sectional view showing the strip in enlarged transverse section in sealing relationship with the two relatively slidable members.

FIGURE 3 is a transverse sectional view illustrating a modification of the strip.

Detailed description

With reference to the drawing, the strip of this invention is shown in FIGURES 1 and 2 as an integral or one-piece plastic extrusion. It consists of a longitudinally extending, inner anchoring or mounting channel arrangement, indicated generally by the numeral 5, an intermediate bulbous, resiliently compressible, diaphragm section 6, and an outer rub strip section or wall 7. All of these sections are extruded from plastic as an integral strip. As indicated above, the sections 5 and 7 are formed of relatively rigid or semi-rigid vinyl plastic material, whereas the section 6 is formed of a lower durometer, relatively flexible, vinyl plastic material, all sections being extruded simultaneously. The relatively rigid and softer sections may be of different compatible plastic compositions or may be of the same plastic compositions plasticized to different degrees and, according to the present invention, the latter is preferred. For example, a polyvinyl chloride compound may be used as the plastic material. The flexible diaphragm section 6 preferably has a hardness of from 40A to 90A Shore durometer. The two plastic materials which form the different sections of the strip are integrally joined together at the orifice of the extrusion machine in a manner well known in the plastic extrusion art.

The channel section 5 is of substantially U-shaped cross-section and includes a central web 8, a barb-like inner anchoring flange 9, and an outer flange 10, which are all coextensive and continuous. The flexible diaphragm section 6 is, as indicated above, of continuous and closed bulbous hollow cross section and is formed with its inner wall adjacent to and integrally joined to the outer face of the flange 10, being coextensive therewith. Formed on the face of the outer wall of the section 6 is the wear strip or rub strip section 7 which is continuous and coextensive with the section 6. This strip section 7 substantially completely covers the outer face of the softer and more flexible section 6 and will prevent wear thereon.

FIGURE 2 shows one example of the use of the present combination weather seal and rub strip. In this view, the reference numeral 11 represents a relatively stationary head frame which borders the upper edge of a sliding door 12. In this instance, the door 12 is arranged for sliding movement in a plane normal to the plane of the drawing. The frame member 11 is formed with an elongated, coextensive anchoring groove, slot, or kerf 13 opening outwardly of the lower edge of the frame member. The keft 13 is adapted to frictionally receive the barb-like flange 9 of the weather seal and rub strip. The web 8 extends over a portion of the lower edge of the frame member 11, while the flange 10 extends upwardly over a portion of the outer face 16 of the frame member 11 adjacent the upper portion of the door 12. This places the diaphragm section 6 and the rub strip 7 in the space 15 provided between the outer face 16 of the frame member 11 and the parallel face 17 of the door 12. The thickness of the section 6 plus the rub strip 7 will normally be slightly greater than the width of the space 15, so that the section 6 will be slightly compressed or flexed inwardly from its normal, relaxed position indicated by broken lines. Thus, there will be a tight seal between the opposed flat parallel surfaces 16 and 17 in all positions of movement of the door 12. During movement of the door 12, the outer surface of the rub strip 7 is maintained in sliding engagement with the adjacent surface 17 and prevents abrasion of the flexible diaphragm section 6. Due to the smooth, slick characteristics of the rigid polyvinyl chloride plastic, the coefficient of friction between the rub strip 7 and the door 12 is relatively slight and materially less than that which would normally exist between a flexible rubbing surface and a sliding door.

FIGURE 3 of the drawing illustrates a modified form of combined weather seal and rub strip according to this invention, in which the continuous-type diaphragm section 6 of FIGURES 1 and 2 is replaced by a pair of relatively separated flexible webs 6a and 6b. In this modified construction, the relatively rigid mounting channel section 5a and the rigid rub strip 7a are separated by the flexible webs 6a and 6b. As will be noted, the flexible web 6a forms an integral continuation of the flange 10a and connects with the upper end of the rub strip 7a. The flexible web 6b connects the lower end of the flange 10a with the lower end of the rub strip 7a. It will be understood that the modified form of combined weather seal and rub strip shown in FIGURE 3 is also formed as an integral, one-piece extrusion from a suitable plastic in which the flexible web portions 6a and 6b are of substantially lower durometer reading than the rigid mounting section 5a and the rub strip 7a. Otherwise, the device of FIGURE 3 operates in the same manner and performs the same functions as does the combined weather seal and rub strip illustrated in FIGURES 1 and 2.

In view of the foregoing, it will be seen that the present invention provides a structurally simple, yet highly efficient combination weather seal and rub strip for various types and styles of movable doors and windows. While preferred embodiments have been illustrated and described in connection with a sliding door arrangement, it will be understood that the present combination weather seal and rub strip may be used with advantage in connection with sliding or casement-type doors or windows generally.

Having thus described this invention, what is claimed is:

1. A combination weather seal and rub strip comprising, an integral plastic extrusion having an elongated relatively rigid mounting section, a longitudinally coextensive rigid rub strip section spaced outwardly from said mounting section, and an intermediate, longitudinally coextensive, resiliently flexible diaphragm section joining said rub strip section with said mounting section and providing for resilient inward movement of said rub strip section toward said mounting section.

2. A strip according to claim 1 in which the material of the intermediate section has a hardness range of from 40A to 90A Shore durometer.

3. A strip according to claim 1 in which the mounting section is a channel section having a barb-like mounting flange at one side thereof.

4. A strip according to claim 3 in which the channel section has an opposed second flange which carries said flexible diaphragm section.

5. A strip according to claim 4 in which the flexible diaphragm section is of tubular cross section and is carried between said second flange and said rub strip section to form a resiliently yieldable bulbous section longitudinally coextensive with said channel section.

6. A strip according to claim 4 in which said diaphragm section is defined by a pair of relatively spaced, resiliently flexible webs extending, respectively, between said second flange and said rub strip section.

References Cited

UNITED STATES PATENTS

| | | | |
|---|---|---|---|
| 2,419,322 | 4/1947 | Matheny | 49—498 |
| 2,636,228 | 4/1953 | Morton | 49—489 X |
| 2,716,788 | 9/1955 | Naramore | 49—498 |
| 2,902,305 | 9/1959 | Poltorak | 49—498 X |
| 3,178,778 | 4/1965 | Reahard | 49—497 |
| 3,295,260 | 1/1967 | Bus et al. | 49—489 |
| 3,360,887 | 1/1968 | Parks et al. | 49—467 X |

FOREIGN PATENTS

| | | |
|---|---|---|
| 617,595 | 2/1949 | Great Britain. |
| 765,253 | 1/1957 | Great Britain. |

DAVID J. WILLIAMOWSKY, *Primary Examiner.*

PHILIP C. KANNAN, *Assistant Examiner.*